UNITED STATES PATENT OFFICE.

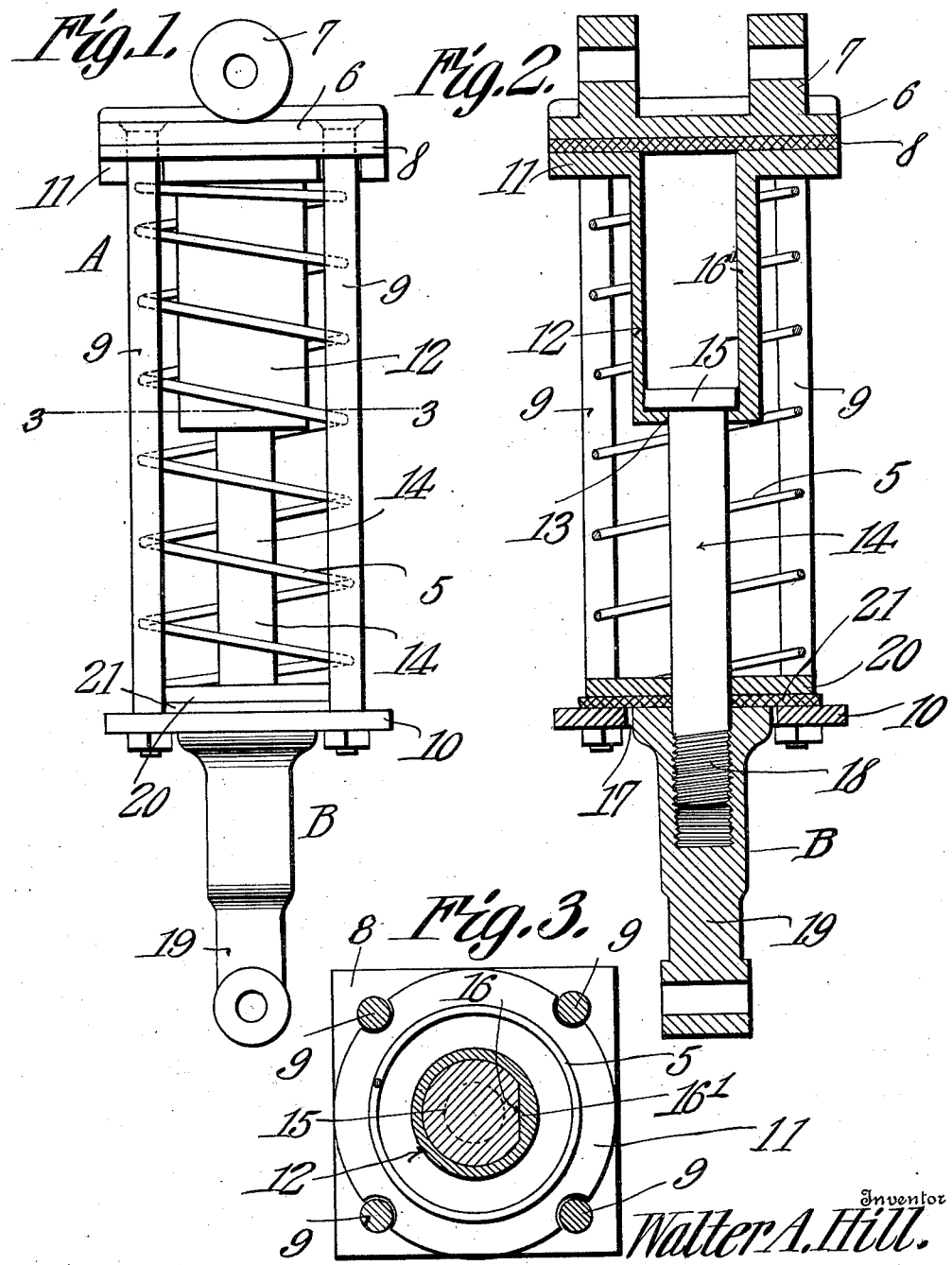

WALTER A. HILL, OF CALLICOON, NEW YORK.

SPRING.

1,032,407.

Specification of Letters Patent. Patented July 16, 1912.

Application filed June 19, 1909. Serial No. 503,164.

*To all whom it may concern:*

Be it known that I, WALTER A. HILL, a citizen of the United States, residing at Callicoon, in the county of Sullivan and State of New York, have invented a new and useful Spring, of which the following is a specification.

It is the object of the present invention to provide an improved construction of spring, and the invention relates more particularly to that class of springs which are employed as cushion elements between two relatively movable members. Ordinarily, such springs, where the members may have movement toward or away from each other, are, under some conditions, compressed, and, under others, are expanded, so that the spring proper is subjected to considerable stress and soon loses its resiliency.

It is therefore the aim of the present invention to provide a construction of spring for use as a cushion element which will only be compressed upon relative movement of the members between which it is disposed.
In other words, it is the aim of the invention to provide a spring which will be compressed whether the members move away from each other or toward each other.

The spring is adaptable to various applications, and may, for example, be employed in a wheel to render the spokes thereof resilient, or may be employed in railway car construction, on vehicles of other construction, and, in fact, in other relations too numerous to enumerate.

In the accompanying drawings:—Figure 1 is a side elevation of the device embodying the present invention. Fig. 2 is a vertical longitudinal sectional view therethrough, taken on the line 2—2 of Fig. 1. Fig. 3 is a horizontal sectional view on the line 3—3 of Fig. 1.

The invention contemplates the provision of a spring which is arranged between two relatively movable members, (which members are capable of moving toward or away from each other) one of said members having positive engagement with the other and of such character as to insure of compression of the springs regardless of the direction of movement of the members.

One of the members above mentioned is indicated in general by the reference character A, and the other by the reference character B, the spring of the device, indicated by the numeral 5, being interposed between these two members, as will be presently fully explained. The member A embodies, among other elements, a primary head which is indicated by the numeral 6, and which is formed with one or more apertured ears 7, for the connection of one of the movable elements which is to be cushioned, such element not being shown in the drawings. The ear or ears 7 are formed upon one flat face of the head 6, and upon the other face of this head there is secured a buffer sheet 8, which may be of leather or any other suitable cushioning material, and inserted through this sheet and secured in the head are guide rods which are indicated by the numeral 9. At their other ends the guide rods 9, which may be of any desired number, are secured to a secondary head, which is indicated by the numeral 10, and which is identical in its form and structure with the head 6, except that it is not provided with the ears 7.

The member B of the device includes, among other elements, a head, which is indicated by the numeral 11, and which has formed or secured thereon a barrel, indicated by the numeral 12 and having a D-shaped bore. This barrel 12 is preferably cylindrical and is open at that end which forms a juncture with the head, its other end being closed except for an opening, through which works a stem indicated by the numeral 14. This stem 14 is provided at that end which projects into the barrel 12 with a D-shaped head, adapted to slide in the D-shaped bore of the barrel 12 and indicated by the numeral 15, and this head has a flattened edge portion 16, riding over a key or enlargement 16' within the barrel 12. The head 10 of the member A is formed axially with an opening, indicated by the numeral 17, and the stem 14 projects through this opening, and, at its end is threaded, as indicated by the numeral 18.

A sleeve-like head 19 is threaded upon the end 18 of the stem 14 and bears against a head 20, which is freely slidable upon the said stem and has upon its inner face a buffer sheet 21, which is similar to the sheet 8, heretofore described.

The spring 5, heretofore mentioned is disposed upon the stem 14 and the barrel 12, and between the heads 11 and 20, and normally separates these heads, so that the head 20 bears normally against the inner face of the fixed head 10 of the member A. It will be understood of course that the spring, forcing the head 20 in the direction stated, will also carry the stem 14 in the same direction, and, as a consequence, the head 15, at the inner end of the stem, will bear at the end of the barrel 12, in which it works.

From the foregoing description of the invention, it will be apparent that when a pull is exerted upon the stem 14, representing the member B in general, the head 11 of the said member B will move toward the head 20 of the member A, and that also, on the other hand, when the members A and B are compressed, the end of the sleeve-like head 19, of the member B, bearing against the head 20 of the said member B, will move this head in the direction of the head 11 of the member B, the stem 14 moving into the barrel 12. Consequently, whether the stress imposed upon the members A and B is such as to tend to separate them or to move them toward each other, the springs 5 will be compressed.

In devices of the type herein disclosed, it is desirable that friction between the parts be reduced to a minimum. With this end in view, the disk or head 20 is notched peripherally for engagement with the rods 9. Similarly, the flange portion of the barrel 12 is peripherally notched to receive the guide rods. The friction between working parts is, therefore, reduced to a minimum. The bore of the barrel 12 is D-shaped, and the head 15 is D-shaped to fit in the bore of the barrel. Owing to this construction, the periphery of the head 15 is made of as small extent as possible, consistent with an engagement between the head and the barrel, which will hold the head and the stem against rotation in the barrel. Friction within the barrel is, therefore, reduced to a minimum.

What is claimed is:—

In a device of the class described, a primary head; a secondary head having an opening; rods connecting the heads; a disk resting against the secondary head and having peripheral notches engaging the rods to afford a slidable mounting for the disk; a barrel having a D-shaped bore and provided with a flange having peripheral notches engaging the rods to afford a slidable mounting for the barrel; a spring inclosing the barrel and thrusting against the flange and against the disk; a stem having a D-shaped head fitting slidably but against rotation in the D-shaped bore of the barrel, and adapted to engage that end of the barrel which is adjacent the disk; and means upon the stem, adapted to register in the opening in the secondary head, for engaging the disk.

In testimony that I claim the foregoing as my own, I have hereto affixed my signature in the presence of two witnesses.

WALTER A. HILL.

Witnesses:
D. J. STARCK,
JOHN DYCKER.